(12) United States Patent
Rickard

(10) Patent No.: US 9,003,206 B2
(45) Date of Patent: Apr. 7, 2015

(54) MANAGING COMMUNICATION AND CONTROL OF POWER COMPONENTS

(75) Inventor: Dale Rickard, Manassas, VA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 1302 days.

(21) Appl. No.: 12/646,724

(22) Filed: Dec. 23, 2009

(65) Prior Publication Data
US 2011/0154085 A1 Jun. 23, 2011

(51) Int. Cl.
G06F 1/26 (2006.01)
G06F 1/00 (2006.01)
G06F 1/32 (2006.01)

(52) U.S. Cl.
CPC .................................. G06F 1/325 (2013.01)

(58) Field of Classification Search
USPC ................................................ 713/300–340
See application file for complete search history.

(56) References Cited

U.S. PATENT DOCUMENTS

| | | | |
|---|---|---|---|
| 5,799,209 A * | 8/1998 | Chatter | 710/56 |
| 6,936,999 B2 | 8/2005 | Chapuis | |
| 6,949,916 B2 | 9/2005 | Chapuis | |
| 7,000,125 B2 | 2/2006 | Chapuis | |
| 7,049,798 B2 | 5/2006 | Chapuis et al. | |
| 7,185,341 B2 * | 2/2007 | Van Hensbergen | 719/312 |
| 7,340,378 B1 * | 3/2008 | Floyd et al. | 702/186 |
| 7,480,702 B2 * | 1/2009 | Cohn et al. | 709/220 |
| 8,255,730 B2 * | 8/2012 | Tatsumi | 713/340 |
| 8,261,103 B2 * | 9/2012 | Richards, III | 713/300 |
| 8,261,112 B2 * | 9/2012 | Carter et al. | 713/320 |
| 8,386,806 B2 * | 2/2013 | Ooi et al. | 713/300 |
| 2006/0253715 A1 * | 11/2006 | Ghiasi et al. | 713/300 |
| 2010/0115304 A1 * | 5/2010 | Finkelstein et al. | 713/320 |

* cited by examiner

Primary Examiner — Tim T Vo
Assistant Examiner — Kim T. Huynh
(74) Attorney, Agent, or Firm — Buchanan Ingersoll & Rooney LLP

(57) ABSTRACT

Systems and methods are disclosed for managing a communication and control of power components. The system includes a parallel bus and plural peripheral devices. Each peripheral device is connected to the parallel bus. The system also includes a control module that is connected to the parallel bus, the control module including memory that stores control data and telemetry data associated with each peripheral device, and an interface that controls access to addressable locations in memory over the parallel bus.

31 Claims, 7 Drawing Sheets

MANAGING COMMUNICATION AND CONTROL OF POWER COMPONENTS

FIELD

A system and method are disclosed for control of peripheral devices and/or monitoring.

BACKGROUND INFORMATION

Modular electronic systems can use digital control to optimize operation, coordinate multiphase operation, manage power sequencing, provide programmable voltages, provide current sharing, report status and telemetry, and manage faults. For example, in a modular system having a power component, one known approach uses a centralized power system controller with non-volatile storage for control parameters. A second known approach uses non-volatile storage in each key power element.

In the first approach, the central controller initializes key power elements in the system at start-up, which can delay start-up and reduce fault tolerance. This approach also can involve high fan-out on the control bus that connects to key power elements in the system.

The second approach can involve manufacturing complexity and high cost because every power component includes non-volatile memory. Moreover, key power elements in the power system can operate at relatively high temperatures that can degrade the lifetime and reliability of the non-volatile memory.

SUMMARY

An exemplary digital control system that manages a power system is disclosed. The system includes a parallel bus and plural peripheral devices, wherein each peripheral device is connected to the parallel bus. A circuit or control module is connected to the plural peripheral devices via the parallel bus the control module having addressable memory to provide each peripheral device access to associated control information stored in the control module.

An exemplary integrated circuit or control module that manages plural peripheral devices in a power system is disclosed. The integrated circuit includes an addressable memory device that stores control and telemetry data for each of the peripheral devices in the power system and a bus interface. The bus interface controls access to an addressable location in the memory device by the plural peripheral devices over a parallel bus.

An exemplary method of managing plural power converter peripherals in a power system having a control module and a parallel bus is disclosed. The method includes the steps of accessing control data stored in an addressable memory location of the control module over the parallel bus, and setting operating conditions and limits of each of the power converter peripherals. Additional steps include executing power control and checking limits at each of the power converter peripherals and determining whether at least one power converter peripheral is operating within predetermined limits. The method also includes receiving, at the control module, status data of the at least one power converter peripheral over the parallel bus based on a result of the determining and adjusting an operating condition of the at least one power converter peripheral based on the result.

An exemplary method of managing plural peripheral devices in a power system that includes a control module, a parallel bus and a second bus, is disclosed. The method includes managing, at the control module, access among the plural peripheral devices to addressable memory over the parallel bus so that each peripheral device stores status and telemetry data at a first location in the addressable memory. An additional step includes controlling, at the control module, access by a system controller to the first location of the addressable memory over the second bus wherein the system controller reads the status and telemetry data of an associated peripheral device over the second bus.

An exemplary control module that manages plural peripheral devices in a power system is disclosed. The control module includes addressable memory and a bus interface connected between the addressable memory and a parallel bus of the power system. The bus interface controls access to a unique location in the addressable memory device by at least one of the plural peripheral devices over the parallel bus. The control module also includes a voltage regulator control circuit that controls power distribution to the at least one peripheral device.

DESCRIPTION OF THE DRAWING FIGURES

In the following, exemplary embodiments of the invention will be described in greater detail with reference to the drawings, wherein.

DETAILED DESCRIPTION

Exemplary embodiments described herein can include a circuit having aggregated volatile and non-volatile memory. The circuit can satisfy memory requirements for control and status reporting of local key power components and any other power components or peripheral devices for which memory support is desired.

Figure 1A:
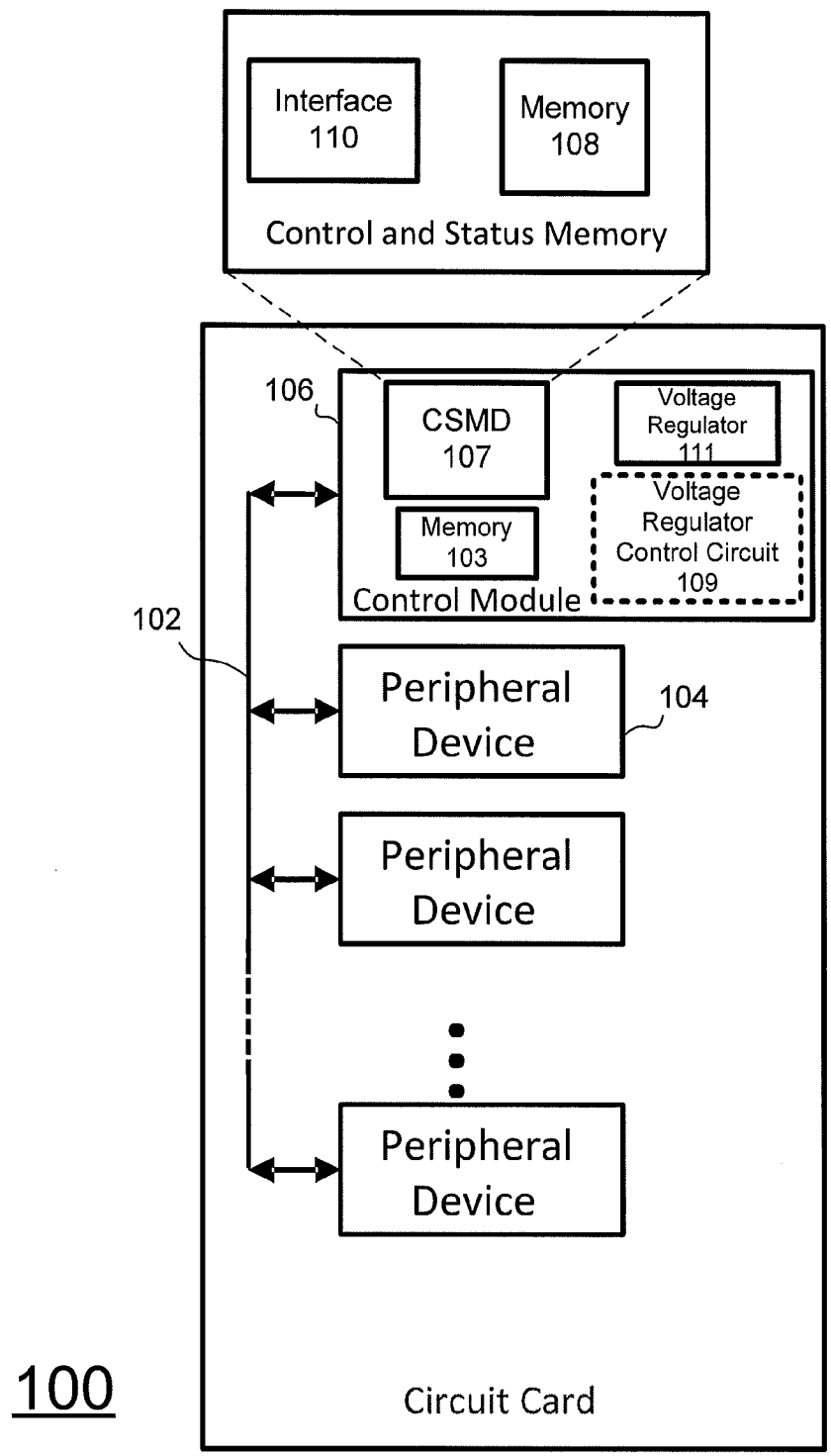
FIG. 1a is a schematic diagram of a peripheral control system in accordance with an exemplary embodiment.

FIG. 1a is a schematic diagram of a digital control system 100 for managing the operation of a power system in accordance with an exemplary embodiment. System 100 can include a parallel bus 102 and plural peripheral devices 104, where each device is connected to the parallel bus 102. The system 100 can also include a control module 106 that is connected to the plural peripheral devices 104 via the parallel bus 102, the control module having an addressable memory device 103 to provide each peripheral device access to associated control information stored in the control module 106. The system 100 can be an electronic system, such as a platform rack, chassis, board, multi-chip module, integrated circuit, or another suitable component having digitally controlled devices.

The control module 106 can include one or plural integrated circuits, such as a control and status memory device (CSMD) 107, which interfaces to the plural peripheral devices 104 via the parallel bus 102. The CSMD 107 is connected to provide each peripheral device 104 access to control information stored at unique memory locations of the addressable memory device 103 in the control module 106. The peripheral devices 104 can include any digitally controlled device, component, or circuit, such as a line conditioner, intermediate bus power converter, point of load power converter, a telemetry and control circuit, and any other suitable device as desired. The parallel bus 102 or peripheral bus facilitates the communication of control data, status data, input data, output data, and telemetry data between the CSMD 107 and each of the peripheral devices.

The CSMD 107 can be an integrated circuit such as a field programmable gate array (FPGA), an Application Specific Integrated Circuit (ASIC), a module containing plural of such circuits, or other suitable circuit as desired. In an exemplary embodiment, the CSMD 107 can be configured to include addressable memory device 108 that stores control and telemetry data for each of the peripheral devices 104 in the power system. The addressable memory device 108 has unique addressable locations associated with each peripheral device 104. The CSMD 107 can also include means, such as a bus interface 110 that controls access to an addressable location in the memory device by the plural peripheral devices 104 over the peripheral bus 102.

In another exemplary embodiment, the system 100 can include plural CSMD 107 and plural peripheral buses 102 for redundancy. It should be appreciated that either of memory 103 provided on the control module 106 and memory 108 provided in the CSMD 107 can be used to store the data associated with each peripheral device 104 at unique addressable locations.

In an exemplary embodiment, the control module 106 can include a voltage regulator control circuit 109 or a complete voltage regulator 111. The voltage regulator can be used to supply power to the CSMD 107, each peripheral device 104, and any other device or circuit on the circuit card as desired. The voltage regulator 111 can be implemented as an internal power supply having a small current or as an internal voltage regulator control circuit 109 with external power devices having a larger current or higher input voltage. The internal power supply can provide a higher level of integration where startup-power can be provided for peripherals on the card as required. Moreover, voltage regulator 111 can provide housekeeping power to power regulators, DC-to-DC converters, and other circuits on the circuit card as required.

Figure 1B:
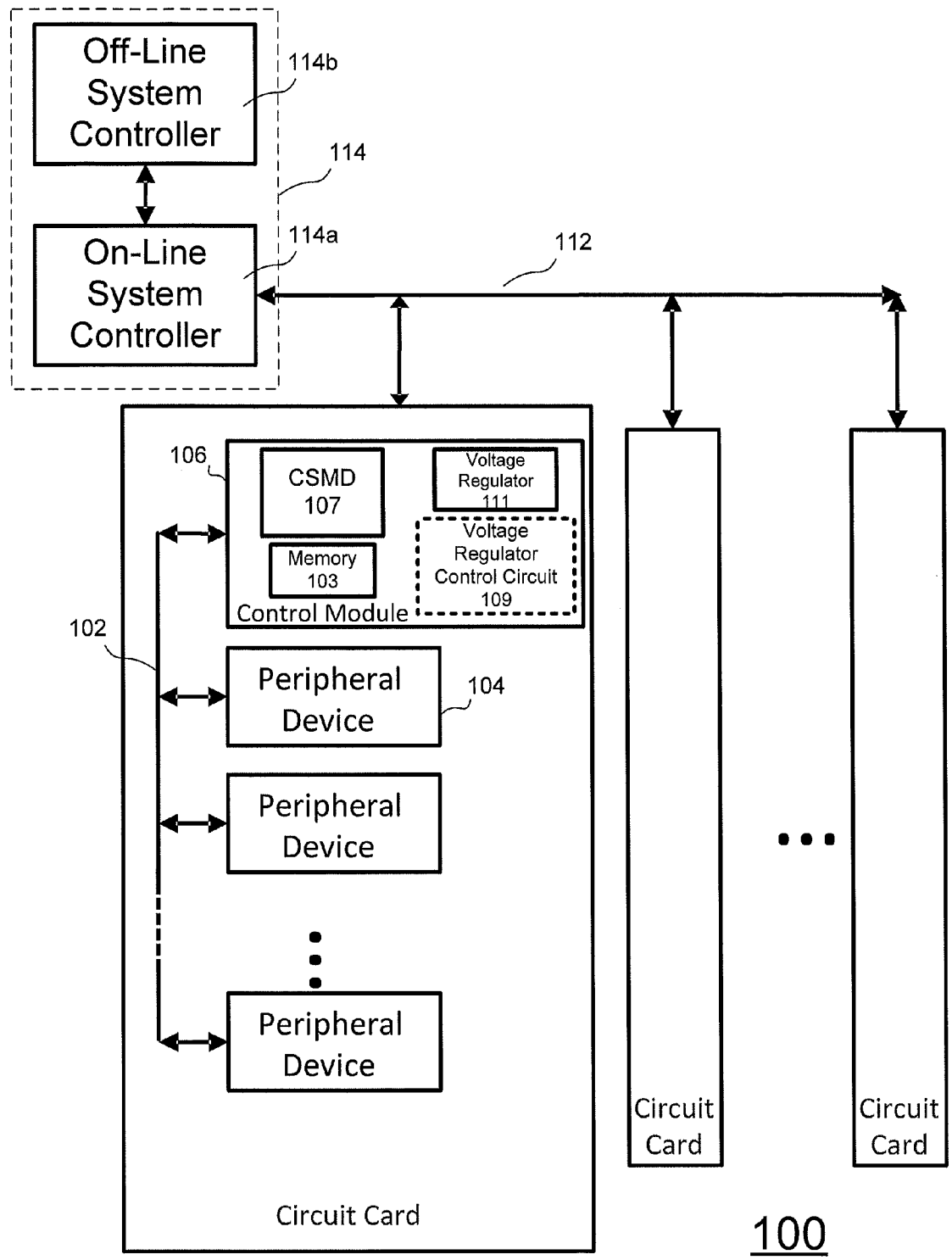
FIG. 1b is a schematic diagram of a peripheral control system having a system control in accordance with an exemplary embodiment.

FIG. 1b is a schematic diagram of a peripheral control system having system control in accordance with an exemplary embodiment.

As shown in FIG. 1b, the system 100 can include a control bus 112 and a system controller 114, wherein the bus interface 110 controls access to the unique locations in the addressable memory 108 of the CSMD 107 by the system controller 114 over the control bus 112. The control bus 112 can be a general parallel or serial bus over which control data, status data and telemetry data can be communicated between the CSMD 107 and the system controller 114.

The system controller 114 can store control data or output data for each peripheral device 104 and write the control or output data to a unique memory location of the CSMD 107 for access by one of the plural peripheral devices 104, such as a target peripheral device 104. The system controller 114 can also read status data and telemetry data of each peripheral device from the unique memory locations of the CSMD 107 and provide the status data and telemetry data on an output to a user or administrator. The system controller 114 can include a microcontroller, microcomputer, personal computer, or any other suitable device as desired.

In an exemplary embodiment, the system controller 114 can be implemented as an on-line controller 114a or an off-line controller 114b. The on-line controller 114a can provide real-time updates of control data for each peripheral device by writing the control data to the unique memory locations of the CSMD 107. Moreover, real-time status monitoring of each peripheral device 104 can be provided by the on-line controller 114a through reading the status and telemetry data stored at the unique memory locations of the CSMD 107. The off-line controller 114b can also be used to write control data for each peripheral device 104 to the unique memory locations of the CSMD 107. The off-line controller 114b is limited, however, in that it does not provide real-time updates of control data when not connected to the CSMD 107. As shown in FIG. 1b, when the system 100 includes both an on-line controller 114a and an off-line controller 114b, the off-line controller 114b is connected to the control bus 112 via the on-line system controller 114a. In another exemplary embodiment the off-line system controller 114b is connected directly to the CSMD 107 through the control bus 112 or similar test interface. In another exemplary embodiment, the system 100 can include plural on-line and off-line system controllers and plural control buses for redundancy.

FIG. 1b also illustrates an exemplary design in which the system 100 includes plural circuit cards, where each circuit card includes a CSMD 107 and plural peripheral devices 104. In this configuration, the CSMD 107 of one circuit card can communicate with a CSMD 107 of another circuit card over the control bus 112.

Figure 1C:
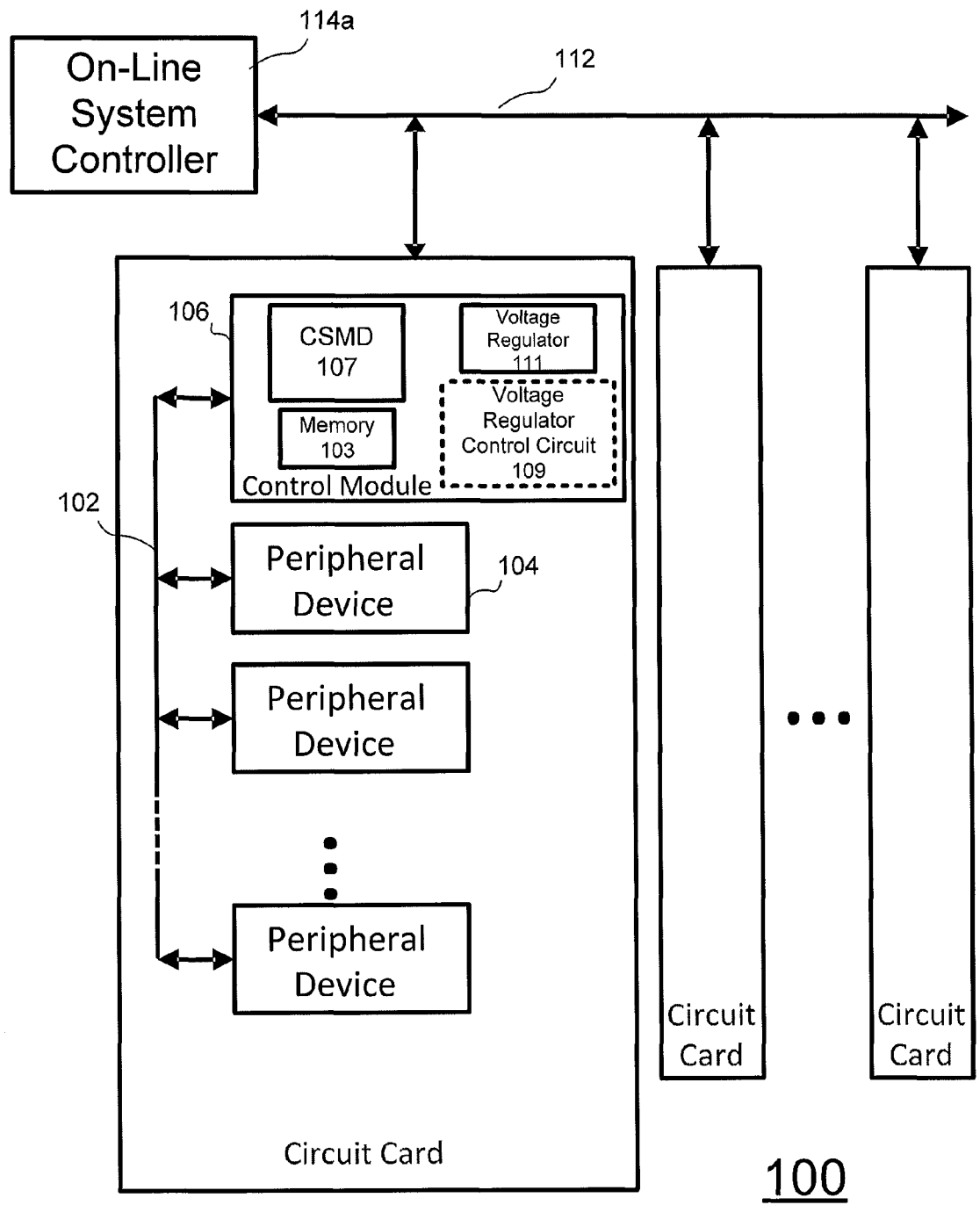
FIG. 1c is a schematic diagram of a peripheral control system using on-line system control in accordance with an exemplary embodiment.
Figure 1D:
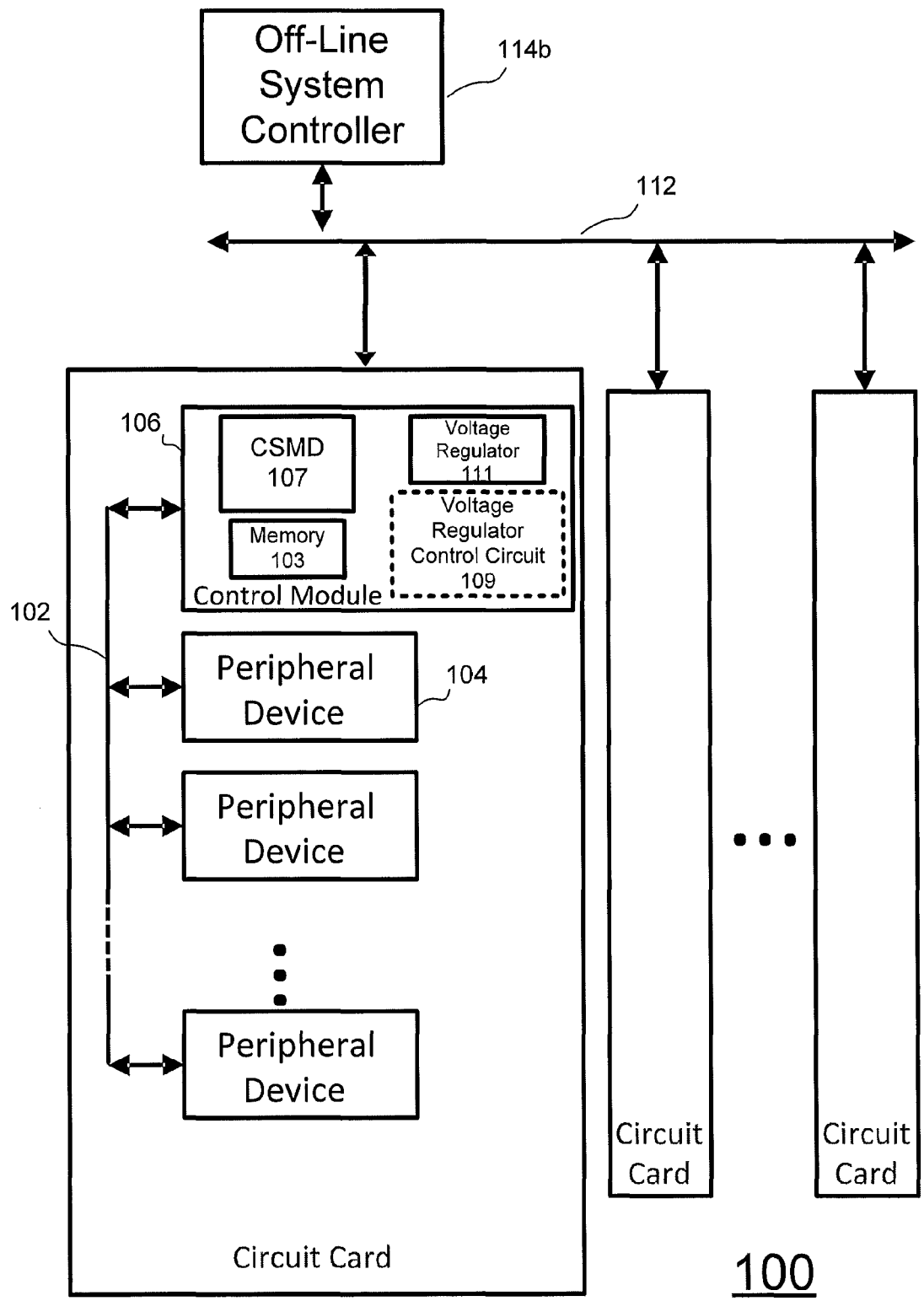
FIG. 1d is a schematic diagram of a peripheral control system using offline system control in accordance with an exemplary embodiment.

FIGS. 1c and 1d are schematic diagrams of exemplary control systems using an on-line system control and an off-line system control, respectively. As shown, system 100 is configured much like the system of FIG. 1b, except that system of FIG. 1c has only an on-line system controller 114b and the system 100 of FIG. 1d has only an off-line system controller 114a.

Figure 2:
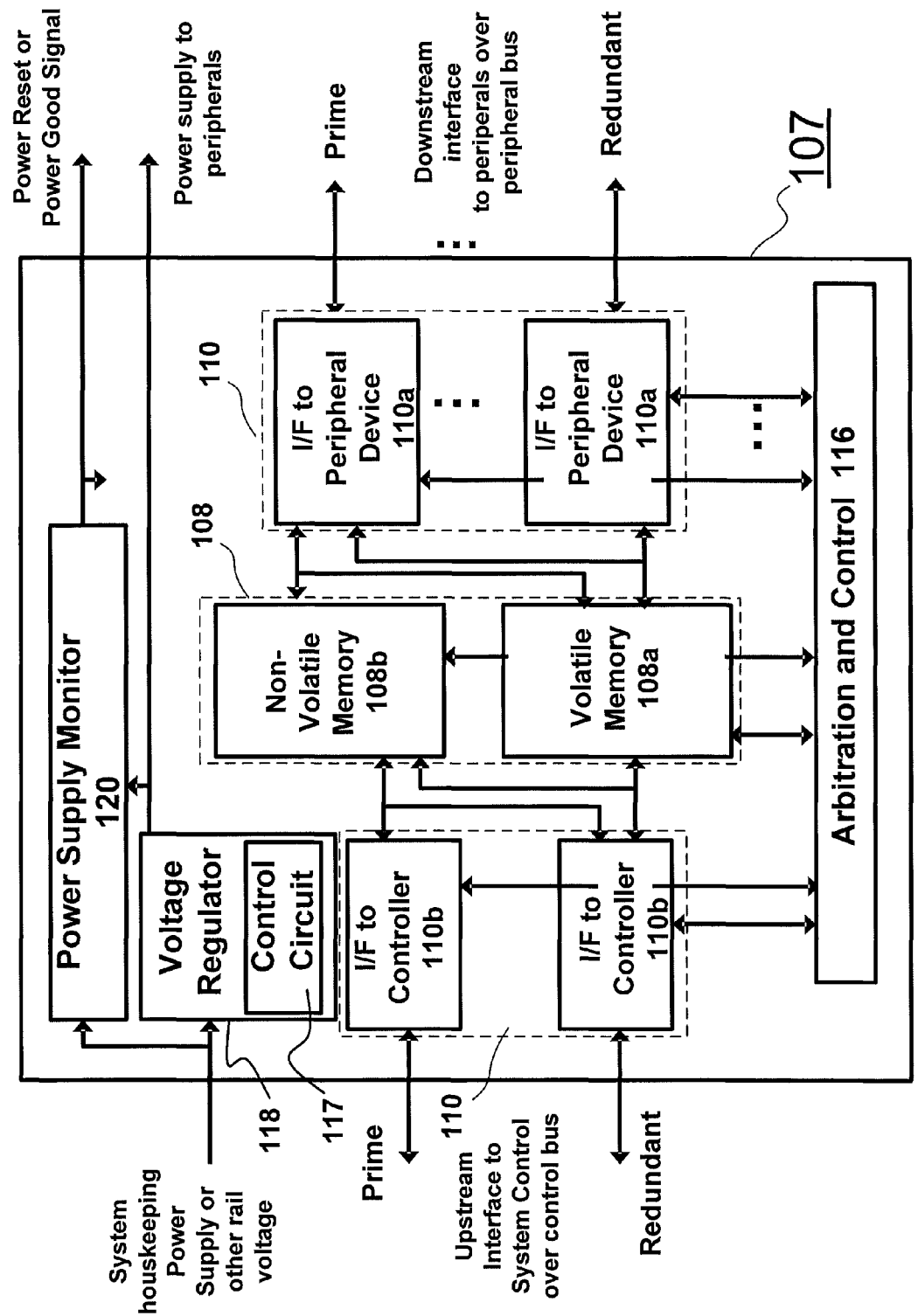
FIG. 2 is a schematic diagram of a control and status memory device in accordance with an exemplary embodiment.

FIG. 2 is a schematic diagram of a control module such as control and status memory device (CSMD) 107, in accordance with an exemplary embodiment.

As discussed above, the CSMD 107 can be configured to include memory 108 and the bus interface 110. The memory 108 can be implemented as a volatile memory 108a and/or a non-volatile memory 108b. The volatile memory 108a can store status information and/or telemetry information associated with each peripheral device 104. The non-volatile memory 108b can include addressable memory locations that store control information and optionally telemetry information associated with each peripheral device 104. The bus interface 110 can include a means, such as a first bus interface 110a, for controlling access to memory 108 over a first bus, such as the peripheral bus 102, and means such as a second bus interface 110b, for controlling access to memory 108 over a second bus, such as the control bus 112. The CSMD 107 can also include means, such as a bus controller 116 for controlling access to the addressable locations of the memory 108 by the system controller 114 and peripheral device 104, where applicable. The bus controller 116 controls (activates/deactivates) the bus interface 110b so that the system controller 114 can perform a read or write operation at the addressable location in the memory 108 over the control bus 112. Similarly, the bus controller 116 controls (activates/deactivates) the bus interface 110a so that the respective peripheral device 104 can perform a read or write operation on the addressable location in memory 108 over the peripheral bus 102. The bus interface 110 receives control signals from the bus controller 116 to enable the system controller 114 and the peripheral device 104, where applicable to access an addressable location of memory 108.

The communication of data between the CSMD 107 and the system controller 114 can be established according to a bus protocol, such as Inter-Integrated Circuit ($I^2C$), System Management Bus (SMBUS), on any other suitable protocol as desired. For example, access to the control bus 112 is arbitrated between the bus interface 110 and an interface (not shown) of the system controller 114 based on one of the aforementioned protocols. In another exemplary embodiment, an off-line system controller 114b is connected to the control bus 112 through the on-line system controller 114a, so that access to the control bus 112 is determined by the on-line system controller 114a and the bus interface 110 of the CSMD 107.

As shown in FIG. 1b, the control system 100 can include plural system controllers 114 where each system controller 114 can be configured to control the output and monitor the status of one or more circuit cards. The control system 100 can include any number of on-line and off-line system controllers (114a, 114b) as desired. Each additional system controller 114 included in the system 100 provides additional redundancies. The on-line system controllers 114a can be connected directly to the control bus 112 whereas the off-line controller 114b is connected to the control bus 112 via an on-line system controller 114a, in a master-slave configuration. In another embodiment the off-line system controller 114b is connected to the CSMD 107 through the control bus 112 and interface controller 110b. Each system controller 114 is connected to communicate with the CSMD 107 over the control bus 112 to access addressable locations of memory 108 within the CSMD 107 via the bus interface 110. The system controller 114 can write configuration data that is targeted to a peripheral device 104 at the unique memory location that is associated with the targeted peripheral device 104. The on-line system controller 114a can be configured to monitor the status of a peripheral device 104 by reading status and/or telemetry data from the unique memory location in the CSMD 107 that is associated with the respective peripheral device 104.

Once loaded with control data the peripheral device 104 can perform its normal operational functions. During operation, the peripheral device 104 can acquire read or write access to the unique memory location in memory 108. This access can be achieved via DMA, a bus master operation, or any other suitable memory accessing technique as desired.

The read operation of the peripheral device 104 can be triggered by the CSMD 107 through the setting of a flag in a register or the issuance of an interrupt. The flag and interrupt notify the peripheral device 104 that data is stored at the associated unique memory location in the CSMD 107. The read operation of the peripheral device 104 can also be performed by the peripheral device 104 polling the CSMD 107.

The peripheral device 104 can write output data, status and telemetry data, or other data to the unique memory location in the CSMD 107. The write operation can be triggered by the CSMD 107, through the polling of the peripheral device 104 or by peripheral device 104 sending an interrupt to the CSMD 107. The interrupt serves as a request for the CSMD 107 to grant the requesting peripheral device 104 access to bus 102 to read data from CSMD 107 or to write input data and/or status and telemetry data to the unique memory location in the CSMD 107.

It should be appreciated that the peripheral device 104 can use the CSMD 107 as a "mailbox" or data input/output (I/O) device. Particularly, the peripheral device 104 can write (push) data to the CSMD 107 over the peripheral bus 102. In this manner the peripheral device 104 actively reports status and/or otherwise stores data in the CSMD 107. Each peripheral device 104 can check the status of another peripheral device by accessing the unique memory location of which status and telemetry data for the other peripheral device is stored.

Moreover, the peripheral device 104 can read (pull) data from the CSMD 107 over the peripheral bus 102. In this manner the peripheral device 104 actively receives control parameters or data.

In an exemplary embodiment, the CSMD 107 can also comprise a voltage regulator control circuit 117 or complete voltage regulator 118. The voltage regulator 118 can be used to provide power to the CSMD 107 and to peripheral devices 104 on the circuit card as needed. The voltage regulator 118 can be implemented as an internal power supply having a small current or as an internal voltage regulator control circuit 117 with external power devices having a larger current or higher input voltage. The internal power supply can provide a higher level of integration where startup-power can be provided for peripherals on the card as required. The voltage regulator 118 can provide housekeeping power to power regulators, DC-to-DC converters, and other circuits as required. The CSMD 107 also comprises a power supply monitor 120 that can monitor the system power supply, the voltage regulator 118 output or both and can provide a power on reset signal and/or power good signal to each peripheral 104 as required.

The following embodiments will be discussed relative to the control system 100 having a single on-line system controller 114a, plural peripheral devices 104, and a CSMD 107. The peripheral devices 104 which acquire control data from the CSMD 107 are hereafter designated as target peripheral devices 104. One of ordinary skill will appreciate that the process as described below can be duplicated for any number of on-line system controllers, redundant CSMDs, peripheral devices, and systems with plural circuit cards comprising CSMDs and peripheral devices as desired.

Figure 3:
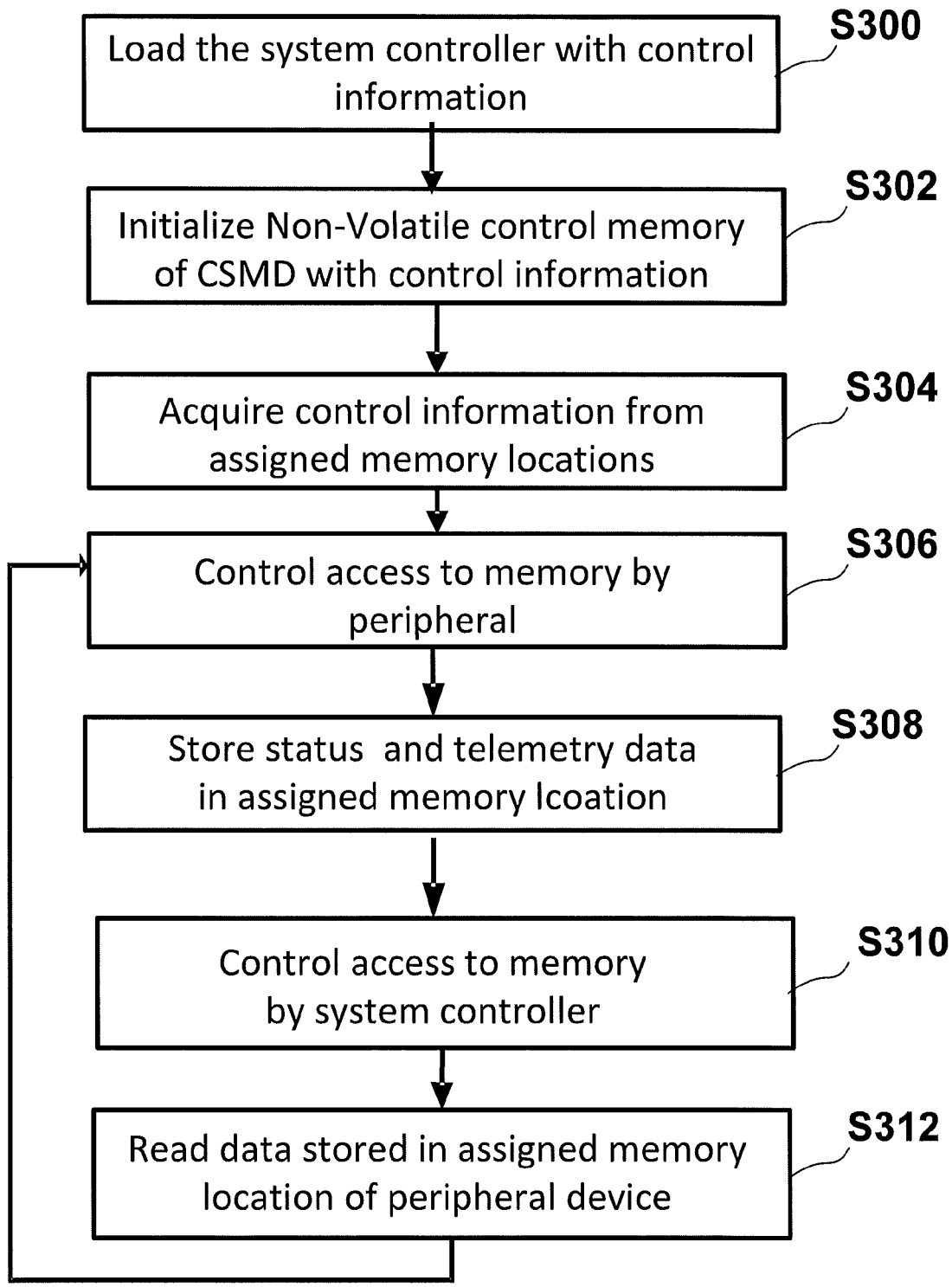
FIG. 3 is a flow diagram of a method of reporting the status of peripheral device in accordance with an exemplary embodiment.

FIG. 3 is a flow diagram of a method for controlling a peripheral device through an integrated circuit, such as the CSMD 107, in accordance with an exemplary embodiment.

As shown in FIG. 3, the system controller 114 can be loaded with control information (S300). As provided herein, control information can be any digital data or information that is used to configure any number of the peripheral devices 104 at startup and/or control the operation of a peripheral device 104. The system controller 114 can be pre-loaded with control information, or can be connected to receive control information from a user/administrator through a user interface, such as a graphical user interface.

Once the system controller 114 is loaded with control information the memory 108 (i.e., non-volatile memory 108a) of the CSMD 107 is initialized by storing the control information (S302). Namely, the system controller 114 writes the control data to a unique memory location for each target peripheral device 104.

In step S304, the peripheral device 104 accesses the associated unique memory location in the CSMD 107 to acquire the control information. The target peripheral device 104 reads (pulls) the control data from the assigned location in the non-volatile memory 108 over the peripheral bus 102 (parallel bus) by reading the data from the CSMD 107 via a Direct Memory Access (DMA), bus master operation, or any other suitable memory accessing technique as desired. The bus controller 116 arbitrates access to the peripheral bus 102 among the plural peripheral devices 104.

Once loaded with control data the peripheral device 104 can perform its normal operational functions. During operation, the CSMD 107 controls or manages access to memory 108 by the peripheral device 104 over the peripheral bus 102 (Step S306). Particularly, the peripheral device 104 writes status and telemetry data or data received from another device at an assigned unique memory location in the volatile memory 108a of the CSMD 107 (Step S308) or optionally in the non-volatile memory 108b of the CSMD 107. The CSMD 107 controls access to the volatile memory 108a and non-volatile memory 108b by the system controller 114 (Step S310). The CSMD 107 can allow the system controller 114 to read a unique memory location of CSMD 107, which is assigned to a target peripheral device 104 (Step S312). The CSMD 107 notifies the system controller 114 when status and telemetry data is available by issuing an interrupt to the system controller 114. Alternatively, the CSMD 107 can provide access to a memory location when it is polled by the system controller 114.

Figure 4:
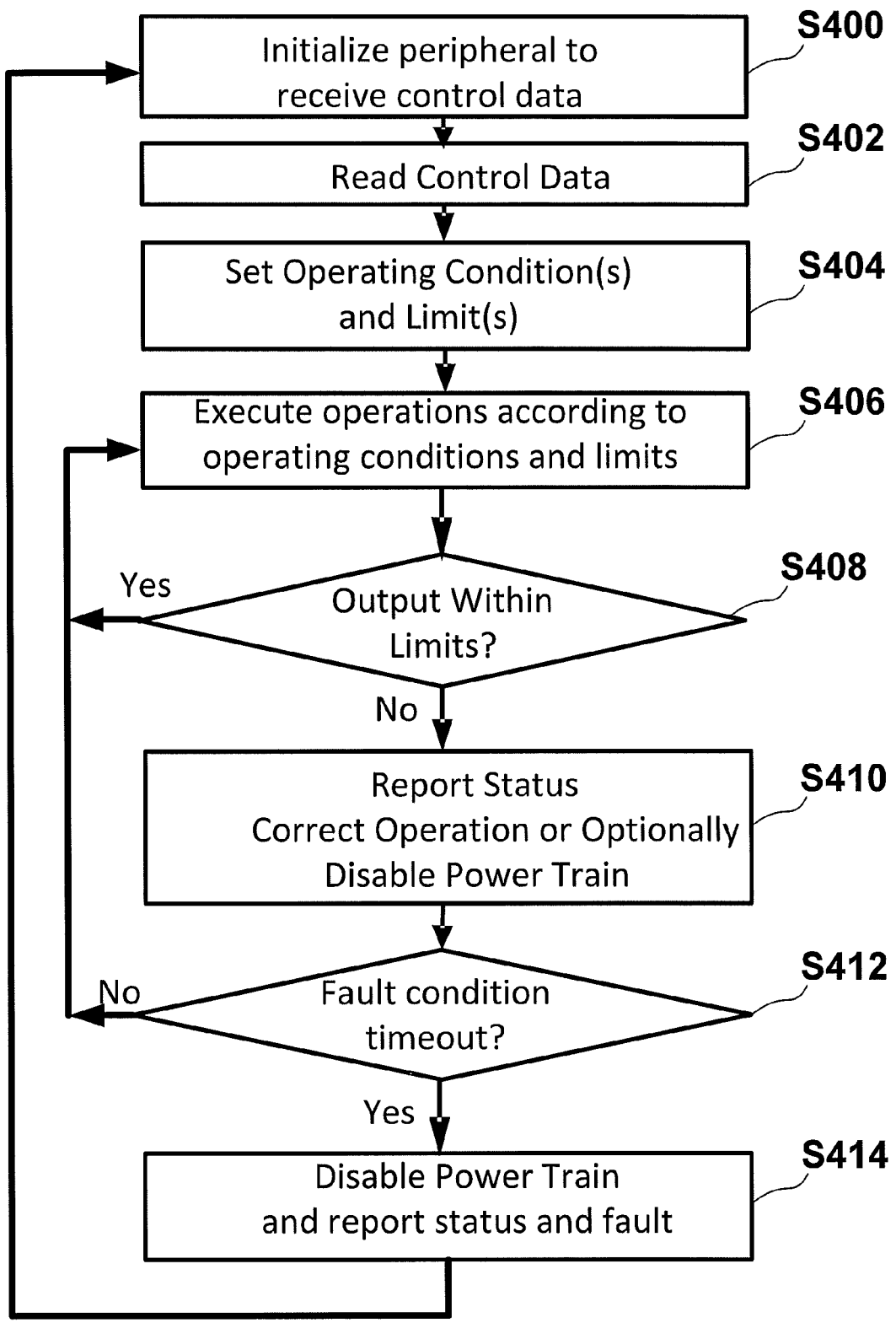
FIG. 4 is a flow diagram of a method of managing a power conditioning peripheral in accordance with an exemplary embodiment.

FIG. 4 is a flow diagram of a method of managing a power conditioning peripheral. In the exemplary embodiment described below, the peripheral device 104 is point of load DC-to-DC converter or power conditioning peripheral.

In step S400, the peripheral is initialized to receive control data. The power conditioning peripheral accesses control data (Step S402), by reading internal default control parameters and/or by accessing the assigned location in memory 108 of the CSMD 107. Based on the control data, the power conditioning device 104 sets operating conditions and sets limits, such as the voltage set point and thresholds (Step S404). The power train of the power conditioning device 104 is enabled and the device 104 performs normal operations. These operations can include providing regulated voltage to a load, monitor limits, report status to the CSMD 107 through write access to memory 108, and periodically check for new operating conditions or limits (Step S406). If the power conditioning device 104 determines that the voltage parameters are within limits, monitoring is continued and status is optionally reported to the CSMD 107 (Steps S408, S406). Alternatively, if the voltage parameters are outside of the prescribed limits, the power conditioning device 104 reports the status to the CSMD 107 (Step S410). The power conditioning device 104 can continue to monitor the fault condition, so that if the fault condition continues for a predetermined timeout period, the power conditioning device 104 can disable the power train and report status and fault data to the CSMD 107 (Steps S412, S414). When the power train is disabled, the power conditioning peripheral process control returns to Step S400 for re-initialization of the power conditioning peripheral to correct the out of limit operating condition.

The exemplary embodiments described herein provide several advantages. The described system is less expensive and less complex as a result of using the control status and memory device (CSMD), because each power component does not require on-board non-volatile memory. Moreover, system level control and status bus fan-out is limited to one load per bus per circuit card rather than one fan-out for each power component in the system. In addition, the non-volatile memory is not required to be co-located with high temperature power components where reliability and lifetime would be limited by the higher temperatures.

The exemplary power system 100 can be implemented in various applications. For example, in a space application two or more CSMD devices can be used on each circuit card to provide fault tolerance and each CSMD 107 can provide redundant interfaces to system controller 114 and peripheral devices 104. Various memory devices, such as chalcogenide random access memory (C-RAM), can be suitably implemented due to limited write endurance, limited temperature range and reduced system manufacturing cost. The memory of the CSMD 107 can be partitioned into a non-volatile portion used for control and status information in situations where the data and/or information needs to survive a power down situation, and a volatile portion for control and status information that is regularly updated during operation of the system and does not need to survive a power down situation thus reducing write to slower non-volatile memory with limited write endurance.

While the invention has been described with reference to specific embodiments, this description is merely representative of the invention and is not to be construed to limiting the invention. Various modifications and applications may occur to those skilled in the art without departing from the true spirit and scope of the invention as defined by the appending claims.

What is claimed is:

1. A digital control system for managing operation of a power system, comprising:
  a parallel bus;
  plural peripheral devices, wherein each peripheral device is connected to the parallel bus;
  a control module connected to the plural peripheral devices via the parallel bus, the control module having addressable memory to provide each peripheral device access to associated control information stored in the control module, each peripheral device being configured to access a unique location in the addressable memory and the control module, and the control module being configured to arbitrate access to the parallel bus among the plural peripheral devices; and
  a system controller configured to access the addressable memory locations of the control module to configure and monitor the plural peripheral devices,
  wherein at least one of the peripheral devices is a power converter peripheral that is configured to set operating conditions and voltage limits based on the control information, and store a status of the operating conditions and voltage limits at the unique location in the addressable memory of the control module for access by the system controller.

2. The system of claim 1, wherein the control module provides each peripheral device access to at least one of data, status, or control information stored in the addressable memory.

3. The system of claim 1, wherein the control module further provides each peripheral device access to read at least one of data, command, or control information from the addressable memory.

4. The system of claim 1, wherein the control module includes a bus interface that manages access to the addressable memory by the plural peripheral devices over the parallel bus.

5. The system of claim 4, wherein the parallel bus is a first bus, the system further comprising:
  a second bus, wherein the bus interface of the control module is connected to provide the system controller with read and write access to the addressable memory over the second bus.

6. The system of claim 5, wherein the control module is a first control module, the system comprises:
a second control module,
wherein the second control module is connected to communicate with the first control module and the system controller over the second bus.

7. The system of claim 5, wherein the system controller is an off-line controller or an on-line controller.

8. The system of claim 5, wherein the system controller is a first system controller, the system comprising:
a second system controller connected to the second bus.

9. The system of claim 8, wherein the system controller is a first system controller, the system comprising:
a third system controller connected to the first system controller.

10. The system of claim 5, wherein the system controller is a first system controller, the system comprising:
a second system controller connected to the first system controller.

11. The system of claim 4, wherein the control module includes at least one integrated circuit, the at least one integrated circuit being connected to the bus interface to communicate with the system controller over the second bus.

12. The system of claim 1, wherein each of the plural peripheral devices is a device selected from the group consisting of:
a digital input/output, a power switch, an analog-to-digital converter, a digital-to-analog converter, a mixed signal interface, a telemetry collection device, an isolated DC-to-DC converter, a power switch, a linear power regulator, and a point of load power converter device.

13. An integrated circuit that manages plural peripheral devices in a power system, comprising:
an addressable memory device that stores control and telemetry data for each of the peripheral devices in the power system;
a first bus interface that controls access to an addressable location in the memory device by the plural peripheral devices over a parallel bus;
a second bus interface that controls access to the addressable location in the memory device by external processors for configuring and monitoring the plural peripheral devices over a control bus; and
a controller configured to arbitrate access to the parallel bus among the plural peripheral devices for setting operating conditions and limits to regulate voltage supplied to a load, and configured to arbitrate access to the control bus among the external processors for monitoring a fault condition at the load when voltage parameters are outside predetermined limits.

14. The integrated circuit of claim 13, wherein the memory device includes volatile memory.

15. The integrated circuit of claim 13, wherein the memory device includes non-volatile memory.

16. The integrated circuit of claim 13, further comprising a control circuit for a voltage regulator.

17. The integrated circuit of claim 16, wherein the voltage regulator provides housekeeping power to the integrated circuit.

18. The integrated circuit of claim 16, wherein the voltage regulator provides housekeeping power to the plural peripheral devices.

19. The integrated circuit of claim 13, comprising a power supply monitor.

20. The integrated circuit of claim 19, wherein the power supply monitor provides a power good signal to the plural peripheral devices.

21. The integrated circuit of claim 19, wherein the power supply monitor provides a power on reset signal to the plural peripheral devices.

22. A method of managing plural power converter peripherals in a power system, having a control module and a parallel bus comprising:
accessing control data stored in an addressable memory location of the control module over the parallel bus, the addressable memory location being associated with a respective peripheral;
setting operating conditions and limits at the respective power converter peripheral;
executing power control and checking limits at respective power converter peripheral;
determining whether the respective power converter peripheral is operating within predetermined limits;
receiving, in the addressable memory location at the control module, status data of the respective power converter peripheral over the parallel bus, based on a result of the determining;
accessing the status data of the respective power converter peripheral from the addressable memory location at the control module over a control bus;
receiving, in another addressable memory location of the control module over the control bus, configuration data for the respective power converter peripheral;
adjusting an operating condition of the respective power converter peripheral, based on the configuration data, when the respective power converter peripheral accesses the configuration data in the other addressable memory location.

23. A method of managing plural peripheral devices in a power system that includes a control module, a parallel bus, and a second bus, the method comprising:
managing, at a control module, access among plural peripheral devices to addressable memory over a parallel bus so that each peripheral device stores status and telemetry data at a first location in the addressable memory and reads control data from a second location in the addressable memory for setting operating conditions and limits to regulate voltage supplied to a load; and
controlling, at the control module, access by a system controller to the first location of the addressable memory over the second bus, wherein the system controller reads the status and telemetry data of an associated peripheral device and writes control data to the second location in addressable memory over the second bus for monitoring a fault condition at the load when voltage parameters are outside predetermined limits.

24. A control module that manages plural peripheral devices in a power system comprising:
addressable memory;
a first bus interface connected between the addressable memory and a parallel bus of the power system, wherein the first bus interface controls access to a unique location in the addressable memory by at least one of the plural peripheral devices over the parallel bus for setting operating conditions and limits to regulate voltage supplied to a load;
a second bus interface that controls access to the unique location in the addressable memory by external processors for configuring and monitoring a fault condition at the at least one peripheral device over a second bus when voltage parameters are outside predetermined limits; and a voltage regulator control circuit that controls power distributed to the at least one peripheral device.

25. The control module of claim 24, wherein the addressable memory device includes volatile memory.

26. The control module of claim 24, wherein the addressable memory device includes non-volatile memory.

27. The control module of claim 24, wherein the voltage regulator provides housekeeping power to the control module.

28. The control module of claim 24, wherein the voltage regulator provides housekeeping power to the plural peripheral devices.

29. The control module of claim 24, comprising a power supply monitor.

30. The control module of claim 29, wherein the power supply monitor provides a power good signal to the plural peripheral devices.

31. The control module of claim 29, wherein the power supply monitor provides a power on reset signal to the plural peripheral devices.

\* \* \* \* \*